(12) United States Patent
Adkisson

(10) Patent No.: US 6,385,676 B1
(45) Date of Patent: May 7, 2002

(54) COHERENT ORDERING QUEUE FOR COMPUTER SYSTEM

(75) Inventor: Richard W. Adkisson, Dallas, TX (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/351,988

(22) Filed: Jul. 12, 1999

(51) Int. Cl.[7] ............................ G06F 13/00; G06F 12/00
(52) U.S. Cl. ......................................... 710/100; 711/141
(58) Field of Search ................................. 711/141–146; 710/52–57, 100

(56) References Cited

U.S. PATENT DOCUMENTS

| | | | | |
|---|---|---|---|---|
| 5,638,534 A | * | 6/1997 | Mote, Jr. | 711/158 |
| 5,666,494 A | * | 9/1997 | Mote, Jr. | 711/167 |
| 5,919,251 A | * | 7/1999 | Tran | 710/52 |
| 6,047,334 A | * | 4/2000 | Langendorf et al. | 710/5 |
| 6,141,747 A | * | 10/2000 | Witt | 712/225 |

* cited by examiner

Primary Examiner—Sumati Lefkowitz

(57) ABSTRACT

The coherent ordering queue in a processing agent chip in a multi-node processor system is designed so as to permit maximum flexibility with the various write operations of different processors, while decreasing the queue depth and increasing queue width for increased efficiency in searching and processing the queue.

20 Claims, 6 Drawing Sheets

COHERENT ORDERING QUEUE FOR COMPUTER SYSTEM

TECHNICAL FIELD

This application relates in general to multi-processor computer systems and in particular to a coherency ordering queue for memory operations, including write operations.

BACKGROUND

In prior art systems, a response queue is used by a processor to hold information that is being sent to memory via a memory controller, or to other processors after passing through the memory. Typically, each processor in a multi-processor system has its own associated response queue. In order to allow the response queue to properly function, a certain set structure is imposed on the ordering of the information in the queues. However, this structure can limit the flexibility of the system, and the nature of multi-processor systems is such that different types of write operations may be desirable in a response queue. However, providing different types of write operations would entail increasing the size of the header queue, which is the portion of the system which keeps track of what is in the response queue. The structure of a response queue is such that a queue can generally hold a number of write operations of data ("writes"), e.g. in 16 slots. Because the write operation necessarily occupies a number of slots (e.g five slots) at a time, there are a limited number of operations that can be stored in the queue, for example, three writes of five slots (e.g. four slots for data, and one for the address), and one return short (i.e., a read to a processor which utilizes a register rather than cache, or memory space, and thus uses one slot). Thus, all this structure yields a certain amount of systematic rigidity which might preclude the use of different types of transactions.

Some multiprocessor systems have coherent memory operations, which are operations that are sent to or from a processor which will operate on memory and keep the processor caches in the system consistent with each other and the memory. Coherency operations requires that the processor be able to send/receive coherency messages to/from the memory controller. These messages are stored in a coherency queue that is different from the response queue. Coherency messages include coherency-shared (cache has data shared), coherencycopy-out (cache will supply the data in a copy-out operation) or coherency-ok (cache check done, neither shared nor copy-out). To maintain coherency, these systems will use a coherency order queue to maintain the order of the responses in the response queue and the coherency messages in the coherency queue. Note that the coherency queue may be merged into the coherency order queue, since the messages may be 1 or 2 bits in size. Further note that since a coherency message can be sent out substantially simultaneously as a write response, then the coherency ordering queue must track these entries separately. Thus, the coherency ordering queue would be able to record that at time X both a response and coherency message was sent out, while at time X+1 only a response was sent out, and at time X+2 only a coherency message was sent out. As write responses are placed into the response queue, markers are placed into the coherency ordering queue, and as write responses are sent out of the response queue, their associated markers are cleared from the coherency ordering queue.

The coherency signal message coherency-ok is a signal that the processor associated with the queue that has checked the ownership of a particular memory location. Since the response queue may have a prior (or earlier in time) write that involves the same memory location as a subsequent (or later in time) coherency signal stored in the coherency queue, then all prior writes must be cleared before a coherency signal is cleared. Thus, subsequent writes can pass (or be cleared before) prior coherency signals, but subsequent coherency signals cannot pass prior writes.

As subsequent writes are cleared before prior coherency signals, holes in the coherency ordering queue may be created. With the example above, suppose the X+1 write response has been cleared. Since the coherency register was previously empty, then the queue would contain a blank entry at the time slot, as now both the write and coherency registers at that slot are now empty. Such holes create great inefficiencies in queue usage, and possibly may result in queue spillage. For example, suppose the first (oldest) and last slots have coherency messages while the middle slots have write responses. Suppose all of the write responses are cleared. Thus, only the first and last slots have messages, while the remainder of the queue is empty. However, the queue is fill, as additional messages must be added to the end of the queue, which is occupied by a coherency message. Thus, additional messages cannot be added to queue.

To eliminate such holes, the queue is searched after each write has been cleared, and upon finding a hole, the queue is collapsed. This entails shifting the contents of the queue down by one to fill in the hole. Note that the entire contents of the queue is not shifted, but rather only the portion that is upstream from the hole is shifted. This partial shift is known as a collapse. The problem with performing collapses is that the logic required to perform the collapse is both complex and expensive.

Furthermore, the rigidity of queues, when combined with the necessary operation rules, precludes efficient use of searching of the queue unless the collapsing function is used. Also, as the number of entries that the response queue can store increases, the coherent ordering queue also increases in the number of entries (or queue depth) that it can store. Note that queue width is the size of each entry or the number of bits for each entry. Thus, any increase in queue size also results in an increase in the queue search time, more entries have to be searched in order to find the next write for clearing.

It is therefore, desirable to have a system that makes the use of different processors and variable write operations feasible.

It is therefore further desirable to have a system that allows for the efficient searching and collapsing of queues.

SUMMARY OF THE INVENTION

These and other objects, features and technical advantages are achieved by a system and method which provides for a more compact ordering queue by reducing the queue depth and expanding the queue width. Under the design contemplated, the reduced queue depth allows for a quicker search of the queue and for an expanded range of write operations as might be needed in multi-node systems where upgraded processors utilize different types of write operations.

Essentially, the processor agent chip or PAC in a multi-node system is capable of processing request packets and response packets from multiple processors. In doing so, the chip generally utilizes at least a tracker system for tracking coherent request packets sent to the processor, a coherent ordering queue for maintaining order between the response packets (both coherent and write), a response queue which stores a response packet, and a header queue for identifying the contents of the response queue.

The coherency queue in the prior art is structured such that it has a large depth which impedes searching. For example, the depth of the coherency queue in the prior art is 9 slots, because it involves 5 COH operands from the tracker, and 4 response headers (WBs) from the header queue. Each WB, or writeback, operation is tracked with a marker or operand composed of 1 bit, while each COH, or coherency operand is composed of 2 bits. Thus, the overall size in the prior art is a 9×3 ordering queue. Furthermore, it is the applicable rule set, that COHs cannot pass WB, but WBs can pass COHs which wait for a copyout, that slows down the collapsing of the queue as the procedure where WBs pass COHs can produce idle "holes" in the queue. Thus, the prior art structure limits the number of operations which can be utilized, and the system offers a cumbersome sized queue and slow logic by which to search and collapse the queue during processing. As contemplated by the present invention, a compact, more versatile queue design is provided for overcoming these limitations of the prior art ordering queues. More specifically, the present invention overcomes the limitations by managing the ordering queue from the coherency bus, and incrementing or decrementing a count of write operations instead of changing a bit from 1 to 0.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
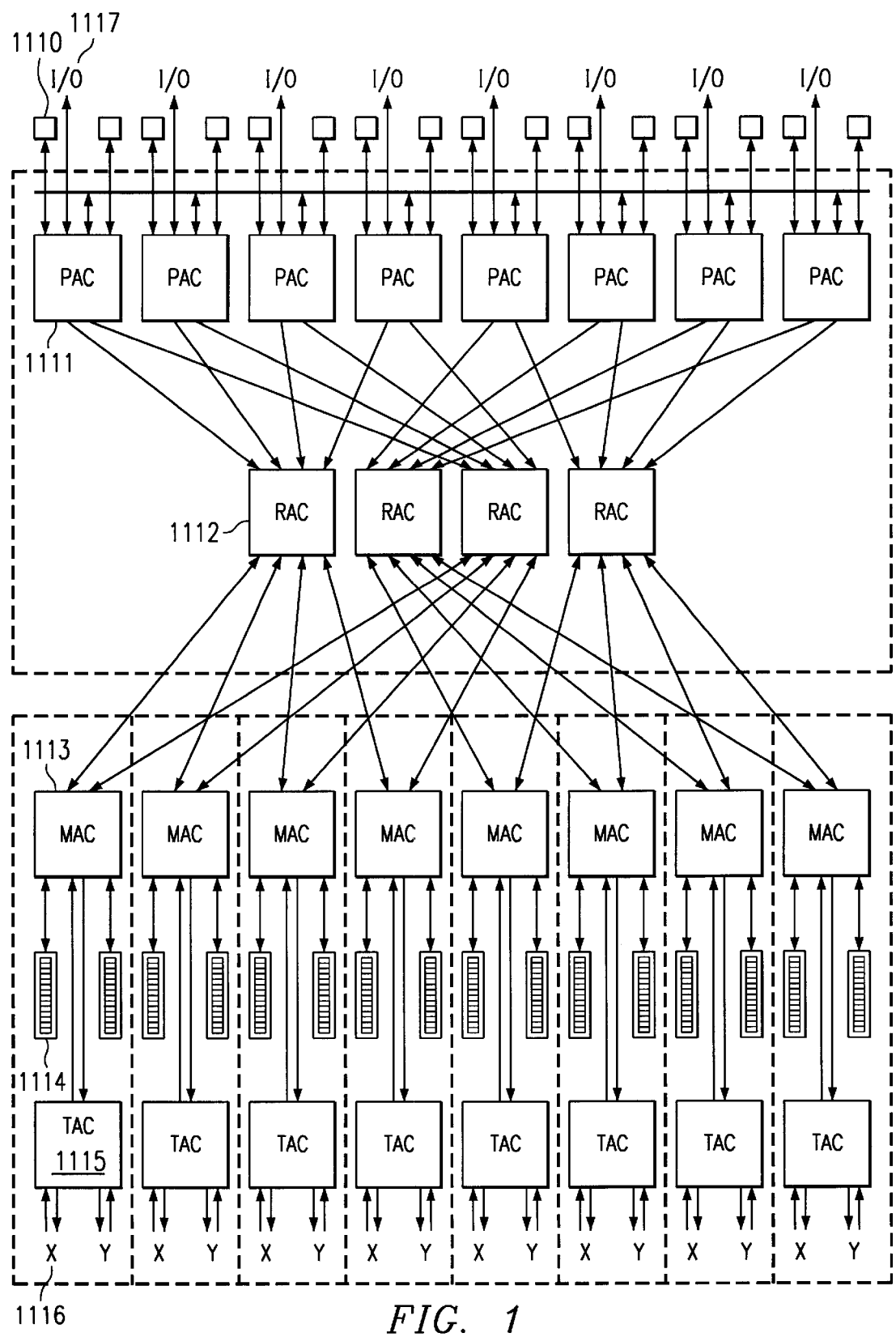
FIG. 1 depicts a single node of a multi-node, multi-processor system that uses the inventive ordering queue design.

FIG. 1 depicts a single node of a multi-node, multi-processor computer system. The overall system may have a plurality of these nodes shown in FIG. 1.

Each node, in the embodiment shown, can support up to sixteen processor boards 1110. Note that each processor board can have up to two processors. These processors are connected to processor agent chips or PACs 1111. The function of each PAC 1111 is to transmit requests from its associated processors through cross bar router chips (RAC) 1112 to the memory access chips (MAC) 1113 and then forward the responses back to the requesting processor. Each PAC 1111 has a connection to an input/output (I/O) subsystem 1117. Each MAC 1113 controls access to its associated coherent memory 1114. When a processor generates a request to access memory (or other resource), the associated PAC 1111 sends the request through the proper RAC 1112 to a MAC 1113. If the request is destined for memory 1114 on the local node, MAC 1113 access the memory attached to it. If the request is destined for memory on another node, MAC 1113 forwards the request to TAC 1115. TAC 1115 is the interface between the node and an SCI ring 1116. TAC 1115 is also known as a toroidal access chip or a SCI controller. The SCI rings 1116 interconnect the node to the other nodes (not shown) in the multi-node system.

Figure 2:
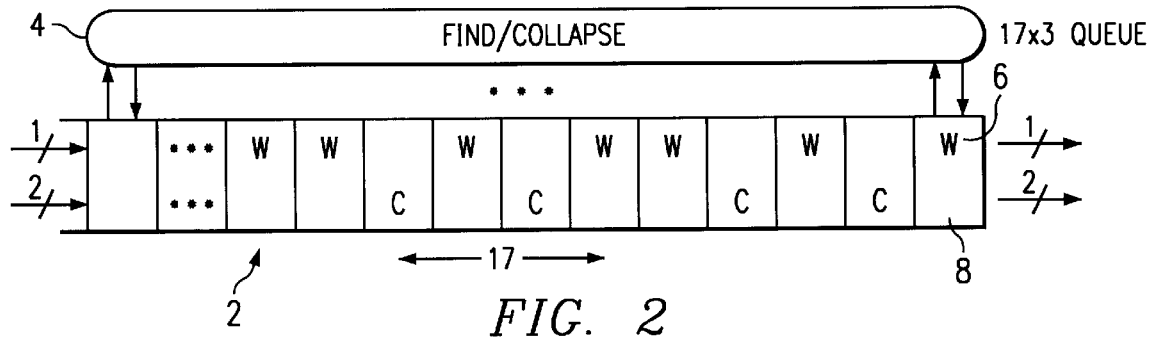
FIG. 2 depicts a conceptual 17×3 ordering queue.

Inside Processor Agent Chip 1111 is an ordering queue, also known as a coherency ordering queue of the present invention, which is conceptually represented in FIG. 2. The queue structure 2 includes a write stream 6, which is a binary representation of the write packets in the response queue, and the coherency stream 8, which is a binary representation of the different coherency states of the cache of one of the processors. Note that there is one coherency stream per processor, see FIG. 7. The find/collapse mechanism 4 is used to prevent holes in the queue from the lack of both a coherency state and write packet in a particular slot. The find/collapse mechanism 4 is also used to find the next sequential write packet for clearing or sending out. This conceptual queue is termed a 17×3 queue because it has a depth of 17, (meaning 17 slots or binary representation, where each slot of depth unit is a number of operations) and a width of 3, meaning 3 bits. The width of 3 is from one writeback (i.e., a write operation) bit, and two bits for the coherency response. The length of seventeen is determined by the header queue, which has a length of twelve, and the coherency tracker queue, which has a length of five. Note that the header queue reflects the number of packets in the response queue with one slot per packet, while packets can take up multiple slots in the response queue. Usage of this conceptual implementation means that it is possible to have twelve pending writes, for example twelve specialized operations such as the "notify cast out" operation, which is a type of operation which one might use with different kinds of processors for discarding data, and five pending coherency states. Nevertheless, implementation of the conceptual 17×3 queue, while able to provide for increased flexibility operations over the prior art, results in a queue which is too inefficient to search.

Figure 3:
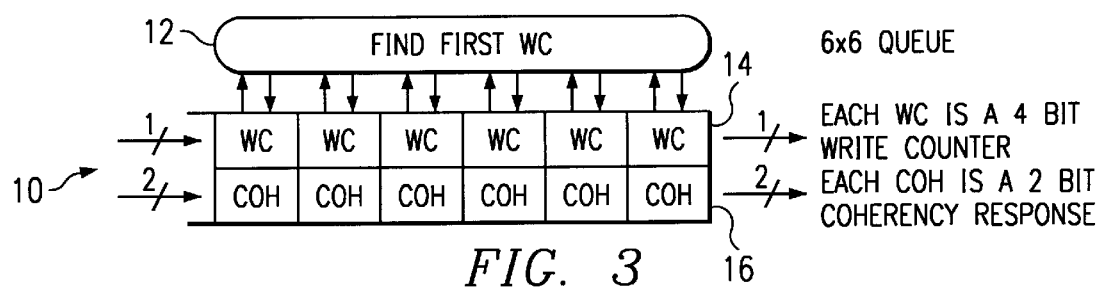
FIG. 3 depicts an implemented 6×6 ordering queue of the present invention.

Thus, turning attention to FIG. 3, is ordering queue 10, with write stream 14, coherency stream 16, and finding operations 12. This queue 10 is a 6×6 queue which incorporates the inventive technical advantages, and tracks the same number of transactions as the 17×3 conceptual queue of FIG. 2. Note that this queue lacks the collapsing mechanism of the queue of FIG. 2, as this queue will not form holes during operations as the queue of FIG. 2. Thus, the additional logic required for this mechanism is not needed. Also note that this queue is only six deep, and thus is much faster to search than the 17 deep queue of FIG. 2.

Figure 4:
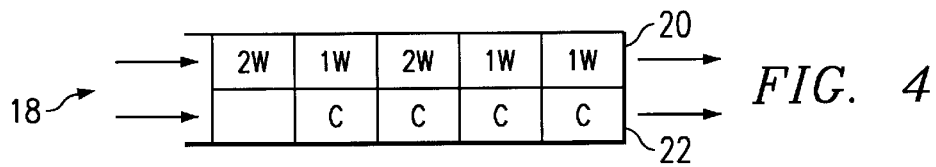
FIG. 4 depicts a conceptual example of queue storage under the present invention.

Accordingly, the 6×6 queue of FIG. 3 may be fully effectuated by an array of write counters, as indicated by write stream 20 of diagrammatic representation 18 of FIG. 4. The contents of the queue of FIG. 4 depicts the same stream of writes and coherency responses as shown in FIG. 2. Note that these streams are by way of example only. This queue tracks the timing relationship between the writes and the coherency responses. As shown in FIG. 2, the sequence is as follows: W, C, W, C, W, W, C, W, C, W, W, . . . . The queue of FIG. 3 stores this sequence in terms of the number of writes until a coherency response arrives. Thus, there is one write and then a coherency response, another write and then a coherency response, then two writes and then a coherency response, and then one write and then a coherency response. The last slot has two writes, and additional writes will be added to this counter until a coherency response arrives. Note that each filled slot has a coherency response, and thus no holes will be generated in the queue by clearing writes. Also note that the writes are stored as a binary count, thus the width of each counter should be able to hold a binary representation of the number of entries in the header queue of the response queue.

In keeping with the example of FIG. 2, the queue of FIG. 3 would have a queue width of six, which comprises two coherency bits, and four bits of a write counter. In more general terms the width of the queue equals coherency bits+ceiling [$\log_2$(Header Queue Depth+1)], which is for the above example 2+ceiling [$\log_2(13)$]=2+4=6. Note that the +1 in the equation permits the range of 0 to the Queue Depth to be counted. Thus, the write counter in the coherency ordering queue tracks all of the writes marked in the header queue. The depth of the queue is related to the number of coherency responses the system tracks at any one time, i.e. the size of the coherency tracker queue. In general terms the depth=1+coherency tracker depth, which is for the above example 1+5=6. Note that 1 added to the tracker depth is to allow for the counting (or tracking) of writes which follow the last coherency response (for example, for writes following the 5$^{th}$ COH response).

Figure 5:
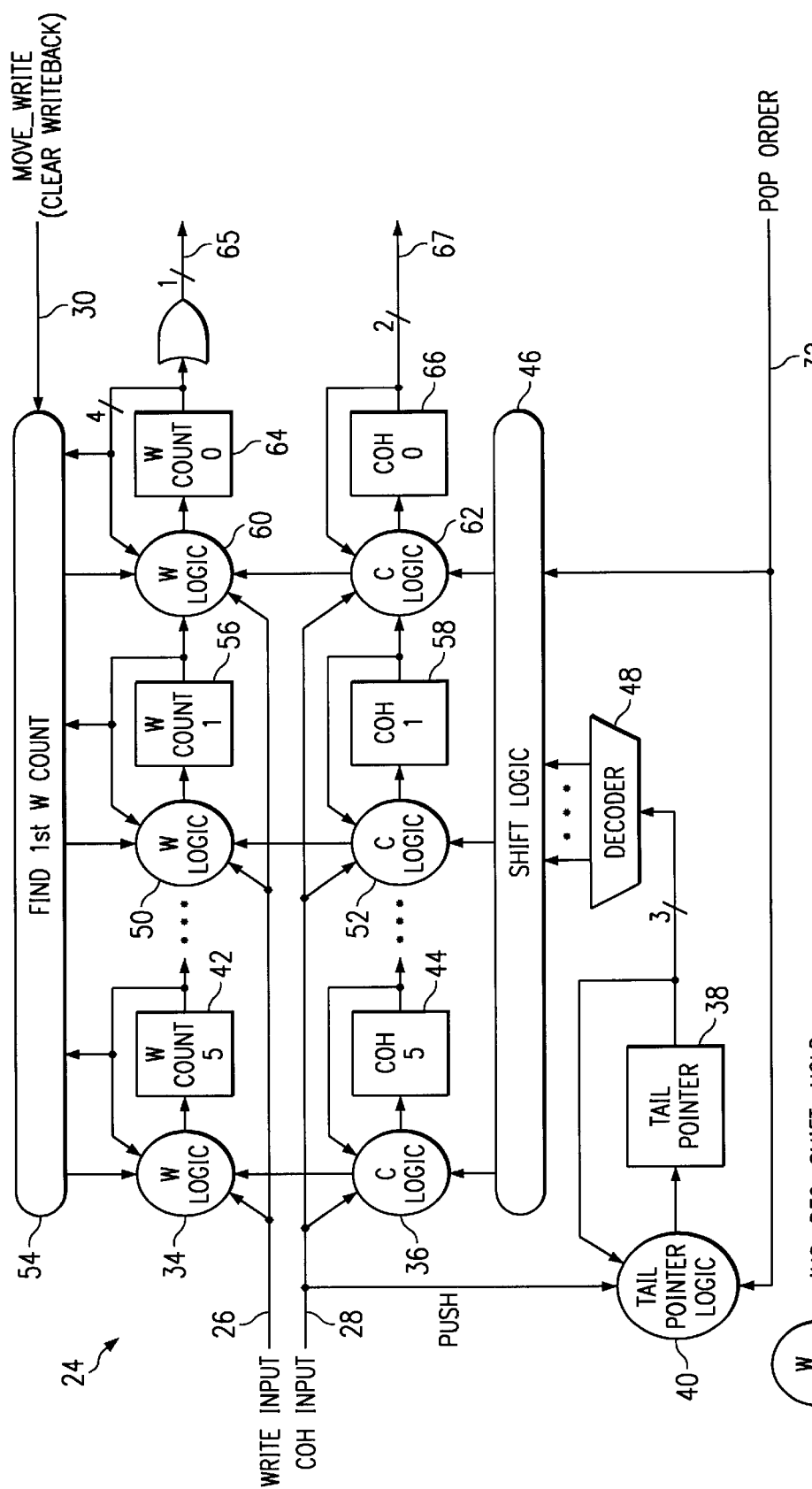
FIG. 5 depicts an actual implementation of the write logic and coherency logic of the present invention.

Accordingly, the system would have a write counter array and a coherency register array, the actual implementation of the structure of which is shown at system 24 of FIG. 5. The upper portion of system 24 depicts the write counters, and the lower portion of system 24 depicts the coherency queue.

The write portion of the system is implemented with an array of counters and the associated logic. As writes are received, the counter associated with the coherency register being pointed to by tail pointer register is incremented. The tail pointer register holds the value of the first available coherency register, which is the most downstream empty coherency register. The same write counter will continue to be incremented until a coherency response comes in, which causes the tail pointer to be incremented by one. Thus, additional writes are then incremented into the next upstream counter. Writes are cleared by decrementing the most downstream write counter. Note that this assumes that writes are removed from the response queue in a sequential manner, such that the oldest response is cleared before a younger response. Thus, the oldest response would be tracked in the most downstream counter.

The coherency portion of the system is implemented much like a queue and includes a tail pointer register 38, which maintains the location of the first available coherency register, and a fixed head location, COH 0 66 which is associated with W count 0 64. The first available coherency register is the first (or most downstream) empty register in the coherency queue portion. Thus as each coherency response enters the queue, they are each loaded into the coherency register pointed to by the tail pointer register, and the tail pointer is incremented. A coherency response is removed from the queue, by popping off the contents of the COH 0 66 register via a shift operation, and the tail pointer is decremented. The shift operation also moves the contents of each of the other COH registers downstream by one place, in other words the contents are shifted toward the front of the queue. Note that the contents of the write counters are also shifted during a pop operation. Thus the management of the queue is done entirely from the coherency response bus perspective.

The following is an example of the operations of the queue of FIG. 5, beginning with an empty queue. Thus, the tail pointer points to the first queue slot location, which would be coherency (COH) location 0 66 and write (W) counter 0 64. As each coherency response come in, they are individually loaded into the location pointed to by the tail pointer. The first COH response is loaded into COH 0, and then the tail pointer is then incremented by one, such that the second COH response is loaded into COH 1, and so on for the next three COH responses. Note that the queue can store up to six COH response, as the logic for COH 5 is depicted, however COH 5 should never become filled, as the system cannot track six COH responses. As COH responses are popped off this queue, the head of the queue (i.e., 0) is used, and then when that item is popped, if there is something in 1 it is moved to 0, and if there is something in 2, it is moved to 1, etc.

As writes come in, the counter pointed to by the tail pointer is incremented. If, in an empty queue, a write is coming in, the queue will increment W counter 0 64. Subsequent writes will increment the same counter, i.e. W counter 0 64, until a coherency response is received. This will increment the tail pointer 38 from 0 to 1, and thus subsequent writes will increment W counter 1 56. As writes are removed from the response queue, the corresponding counter needs to be decremented. Thus, in searching for the appropriate write marker, the system only needs to search a queue depth of 6, rather than 17, to located the first (most downstream) counter holding a count value. Note that there is no need to collapse the queue because the queue is managed from the coherency responses, so if the system decrements a count until it goes to 0, there is no conflict thereon. The next time the system goes through that location, it will find the next count, which is in back of that location.

Figure 8A:
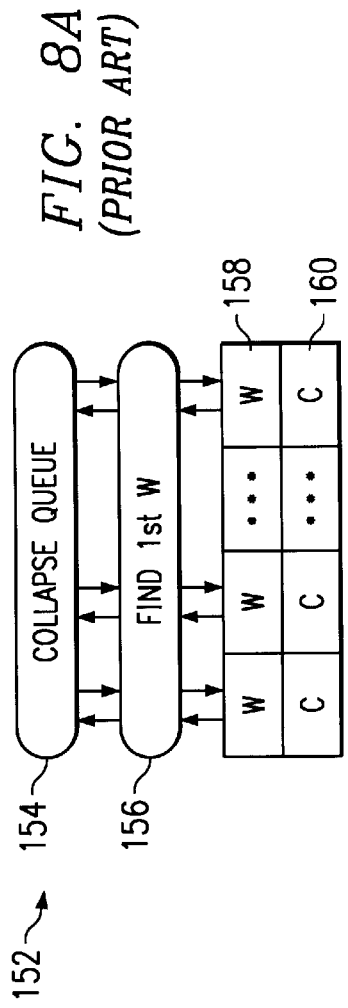
FIGS. 8A and 8B depict the ordering queue of the prior art.

Turning to FIG. 8A, is an example of the prior art coherency order queue 152. In the coherency order queue of the prior art, holes are often created in the queue, because of the queue operational rules whereby a COH response cannot pass a write response or writeback (WB), but WBs can (and do) pass COHs which are waiting for the copyout. Although these rules are used in the present invention so as to prevent incorrect accessing, the inventive ordering queue obviates any such holes because the queue is managed from the coherency response perspective. In fact, as contemplated in the present invention, the only time there will be a write with no corresponding coherency response, will be at the tail end of the stream, as identified by the tail pointer. As such, the line of coherency responses ahead of the empty slot will either be occupied by coherency response or non-existent as the tail pointer is pointing at COH 0. Therefore, holes will not exist. By way of example, wherein there are five coherency responses, the tail pointer points to the end of the queue. In accordance with this, writes will be inserted at the last slot of the queue, and no holes exist between the other COHs. Consequently, there is no need for a collapsing mechanism.

Figure 8B:
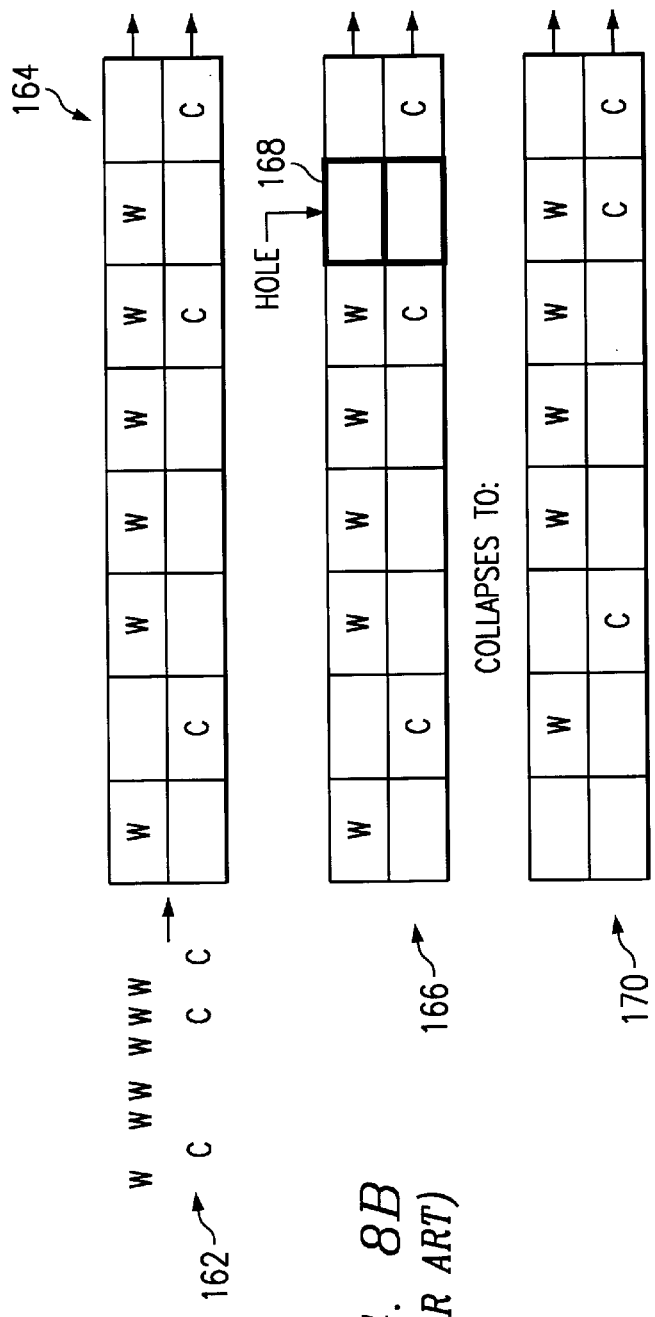

This expedites processing of the queue over the prior art. As seen in FIG. 8B, in the prior art order queue, the compound stream 162 (i.e., the coherency operands and write operations) is coded into the streams in structure 164. A hole 168 is created when the write is cleared. This necessitates a collapse which results in the structure 170.

Figure 9A:
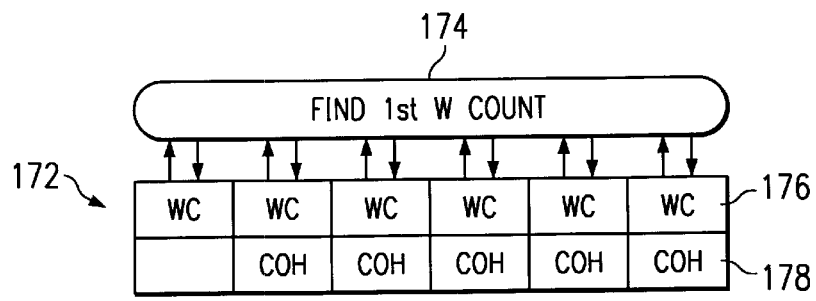
FIGS. 9A and 9B depict the ordering queue of the present invention.

With reference to FIG. 9A, the inventive 6×6 queue, represented generally in FIG. 9 by 172, comprises a write stream 176, a coherency stream 178, and a finding operation 174. As mentioned, the 6×6 queue has a depth of 6, represented by five coherency items and 6 write slots, each of which can track 15 write-backs. The write counters will comprise four bits for a counter and the coherency will comprise a two bit coherency response.

Figure 9B:
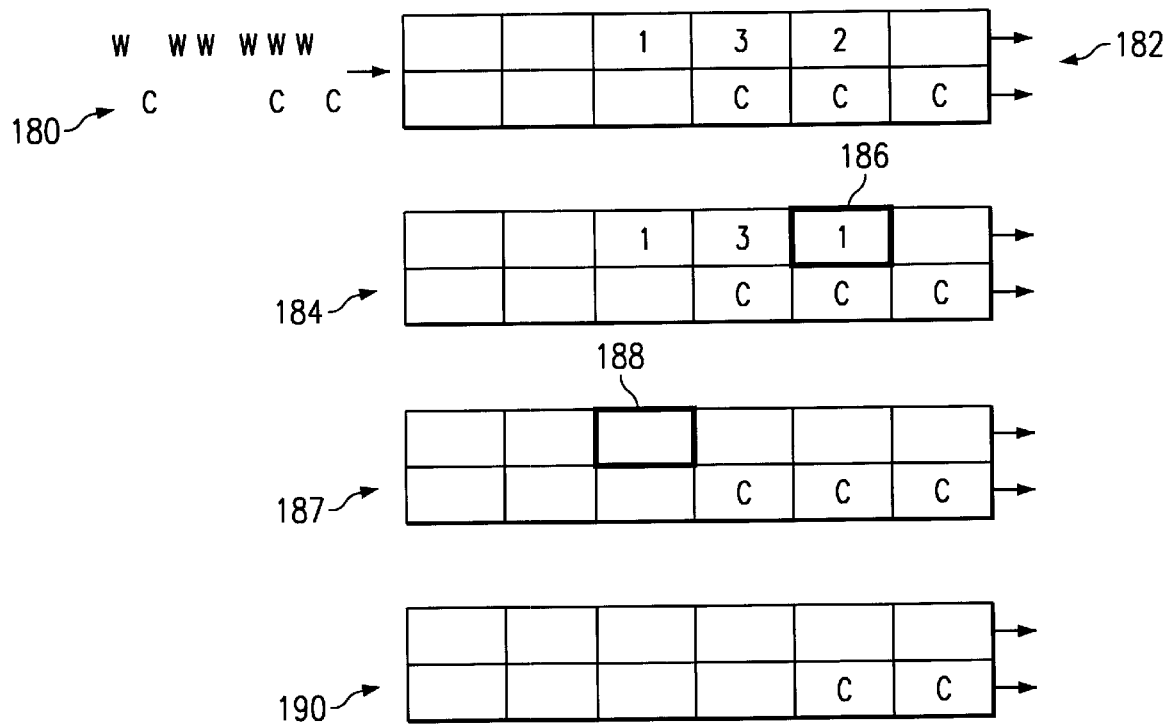

FIG. 9B depicts the operations of the queue 172 which an example input stream 180 having writes W and coherency responses C, as shown. The input stream will result in the queue having values in the registers and counters as shown in 182. Note that the second W is received substantially simultaneously with the second C. This causes the second write counter (WC) to be incremented, the C to be loaded into the second COH register, and the tail pointer register to be incremented. These steps occur substantially simultaneously, such that subsequent Ws are increment the next counter and a subsequent C is loaded into the next COH register, both of which are now being pointed to by the tail pointer. When the first write is cleared, counter 186 is decremented. In this example, all of the writes pass the COHs. At 187 the five remaining writes are moved out of the response queue and suppose a copy-out moves into the response queue. Note that a copy-out request (which is not a write) is not tracked in the 187, as only writes or write-backs are tracked. In this example, the COH at the head of the queue is the COH-copy-out corresponding to the copy-out. Thus, when the last write is cleared from counter 188, the copyout that was in back of the writes is now at the head of the response queue. At 190, a copy-out moves out of the response queue because the copy-out operation is sent to memory when the copy-out is at the head of the response queue and the corresponding COH-copy-out is at the head of the coherency queue, which causes a pop operation on the coherency queue 187. Thus, given the inventive structure, there is no need to collapse the queue since there are no coherency holes and because the write-back counter is rapidly found, and decremented as needed.

The depth of the coherency queue is determined by the system requirement to store as many coherency responses as are in the queue tracker, e.g. five, plus one other location for the writes that follow those five coherency responses. Hence, all that is needed in the present system is for the provision of one plus queue tracker length. Note that this is distinct from the prior art, which required a depth equal to the queue tracker plus the response header queue. Also, the width of the inventive queue is the number of bits used for coherency responses plus the number of bits required for a counter for the maximum number of write-backs that can be pending in the response queue at any given time. In essence, this means that the width of the queue of the present invention will equate to the ceiling of the log base two of the response header queue depth +1, which is 12+1, the information of which requires four bits for storage plus the number of bits in a coherency response, which in this case is 2.

In FIG. 5, tail pointer 38 is a 3-bit pointer which details where in the queue the information will be written. Note that the 3 bits is from the ceiling of the log base 2 of the queue depth, which is six. Thus, 3 bits are required to track six queue slots, e.g. slots 0 to 5. Note that each slot comprises a write counter and an associated COH register. Hence, for an empty queue, the tail pointer will point to slot zero, and received information will be entered into write counter and/or COH register, as appropriate, of slot zero. If, for example, five coherent responses were stored into the coherency queue, then the tail pointer will increment to the sixth location, which is slot five. Note that slot 5 will not be filled with a coherency response, since the tracker queue depth is five and therefore only five coherency requests can be outstanding to the processor any given time. Thus, only five coherency response can be in the coherency queue in slots zero to four, however any subsequent writes will be tracked in slot five. The contents of the tail pointer register are decoded by the decoder 48, which activates one of the slot lines, which is indicative of the slot location to be targeted. For example, a pop 32 can cause the shift logic 46 to shift the target location. Thus, if the queue is empty, then the tail pointer will be set to slot zero. Specifically, a line going to W logic 60 and C logic 62 that feeds into the write count zero and the coherency count zero will be active. If a writeback emerges in write input 26, it is presented to all of the W logic, but only W logic 60 will be active and thus accordingly increment its associated W counter 64.

Similarly, if a coherency response or operand emerges from the coherency input 28, it is simultaneously presented to all of the C logic, however, only C logic 62 will be active and load the coherency response into its associated register 66. Tail pointer 38 also receives the coherency response, and then on the next clock the tail pointer 38 increments or adds one to its current value. The tail pointer 38 will be set to the next cycle and that will have a line which is active connected to W logic 50 and C logic 52, which feeds into W count 1 (as represented at Block 56), and Coherency 1 (as represented at Block 58), respectively. W count 5 (as represented by Block 42), W count 1 (as represented by Block 56), and W count zero (as represented by Block 64), are 4-bit count registers. The coherency registers, e.g. COH 5 44, COH 1 58, and COH 0 66, are 2-bit registers which store one of four coherency responses or operands. Note for the sake of simplicity only 3 of six W logics, W counters, C logics, and C registers are shown in FIG. 5.

As provided for in the present system, a coherency response may be one of three varieties plus a NOP or no-operation. It may be coherency-ok, coherency-copy-out, or coherency-shared. W logic, e.g. 34, 50, 60, provide for four possible operations: increment, decrement, shift, and hold. C logic, e.g. 36, 52, 62, permits three operations: shift, load and hold. The W logic, in the course of recognizing a write input at 26, allows a register to be incremented so the count, e.g. 42, 56, 64, is incremented, and in the course of recognizing a clear write back at 30, allows a register to be decremented so that the count, e.g. 42, 56, 64, is decremented. The W logic can also perform a shift, which is loading from the W count to the left or upstream, in other words a shift is moving the count values to the right or downstream by one position. If no activity is occurring, it is possible to use the hold operation, where the system just holds the previous value. Similarly, the C logic has a shift operation and the shift operation involves shifting the N+1 COH register into the N COH register (e.g. registers 44, 58, 66). Also, the C logic can do a hold by holding the previous value. By way of example, in an empty queue, the tail pointer is zero and will be pointing to W count 0 and COH 0. If a write emerges in the write input 26, (which is a 1-bit field), the W logic will recognize the input and will do an increment. In order to insert a COH, the system will perform a push operation, which causes the C logic to load the COH into the appropriate register, which is the most downstream unfilled register. Note that in order for the system to remove a COH, the system performs a pop operation,.which causes both the W logic and the C logic to shift values from N+1 to N. Accordingly, when popping a queue, both the W logic and C logic will be doing shift operation. In cases of holding a previous value, both W logic and C logic will be doing a hold operation and when modifying the value, the W logic will be doing an increment or decrement, and the C logic 36, 52, 62 will be doing a load. When storing a write, the write counter will be incremented. If storing a coherency response, then the COH register, e.g. 44, 58, 66, will be loaded. With respect to tail pointer 38, tail pointer logic 40 represents combinational logic which would feed tail pointer register 38. Should a coherency input enter COH input 28, the system will do a push on the queue. Every time a COH input comes in, the result will be a push to the back of the queue.

A pop operation 32 is used to remove a COH response from the front of the queue. In the pop operation, the pop order comes in from response control 146 and enters both tail pointer logic 40 and the shift logic 46. The tail pointer logic decrements the value in the tail pointer register 38, and the shift logic 46 invokes a right shift of the values in the COH registers and the W counters. This results in the value stored in COH 0 being sent out of the queue. Note that a pop operation can only occur if the W count 0 counter is empty. After the pop operation, the tail pointer now points to the next element to the right. By way of example, if the current tail pointer value is 2, after the pop operation the tail pointer value will be 1, the contents of COH 0 will have been sent out, and the contents of W count 2 will have been shifted into W count 1, the contents of COH 1 and W count 1 will have been shifted into COH 0 and W count 0, respective. Note that the COH 2 will not have any contents in this example.

A push operation is used to load a COH response into the back of the queue. A push operation is initialed by the arrival of any COH operand or response (note that a NOP is not a response for push operation purposes) on COH input 28. The COH response enters tail pointer logic 40 and is simultaneously presented to all of the C logic blocks. The tail pointer logic increments the value in the tail pointer register 38, and the COH operand is loaded into the active COH register. After the push operation, the tail pointer now points to the next element to the left. By way of example, if the current tail pointer value is 2, after the push operation the tail pointer value will be 3, and any subsequent write inputs will cause the W count 3 counter to be incremented.

Note that simultaneous push and pop operations will result in the tail pointer register maintaining the same value as it had prior to the operations.

The clear writeback 30 is where a write-back is cleared from the queue. This clearing is accomplished by searching the queue via 54 to find the first occurrence of a write, which is a W count, e.g. 42, 56, 64, which is non-zero, and then decrementing it. The search at 54 would look to the first W count (i.e., would find the first W count that is non-zero), and would tell the system to decrement that location. By way of example, if the queue is empty and a write operation emerges in write input 26, W count 64 will be incremented. Furthermore, should a move-write operation enter at 30, the system will clear a write-back. Note that a write input can occur substantially simultaneously with a move write. The end result of these two simultaneous operations would be to increment and decrement the current counter at the same time, which in essence means that the value at the location would stay the same.

Figure 7:
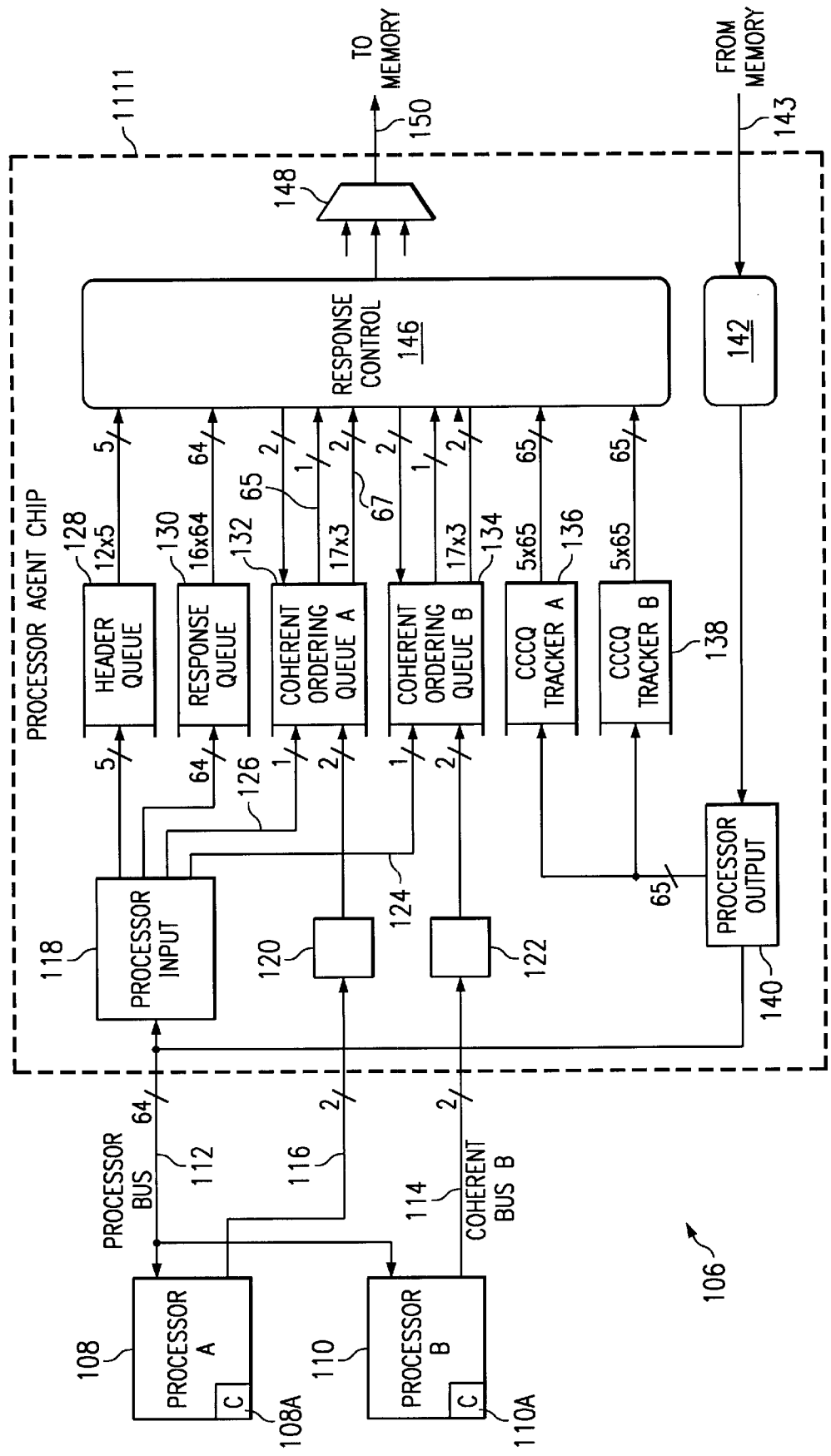
FIG. 7 depicts the ordering queue operation inside the inventive processor agent chip.

Turning to FIG. 7, the structure 106 which comprises the processor agent chip 1111, preferably contains two processors, processor A 108 and processor B 110. Included in structure 106, is input from memory at 143, output to memory at 150, processor output at 140, processor input at 118, processor bus 112 (connected to both processor A 108 and processor B 110), and coherency bus 114. Included on processor A is cache 108A and included on processor B is cache 110A. Processor A 108 and processor B 110 are connected to coherent ordering queue A 132 and coherent ordering queue B 134, via coherent buses 116 and 114. Coherent ordering queue A 132 and coherent ordering queue B 134 are connected to processor input 118 via lines 126 and 124 respectively. The processor input 118 is also connected to response queue 130 and header queue 128. Line 112 represents a processor bus which has a 64 bit field, while lines 114 and 116 represent coherency buses, each of which has a 2 bit field. Processor input 118 and coherency boxes 120 and 122 all represent registers which are utilized in the timing of the system such that elements coming from either location would enter the coherency queue at the same time.

Write stream output 65 from FIG. 5 and coherency stream output 67 from the compound stream of the coherency ordering, which are similarly represented in FIG. 7 as 65 and 67, are the outputs of the coherent ordering queues. Write stream output 65 represents a one bit field, which is a marker representing the write back in the header queue, and coherency stream output 67 represents a 2 bit field, which is the coherency response.

Provision of two processors, processor A as represented in Block 108, and processor B as represented in Block 110, requires the use of two different coherency buses and two tracker queues to track the items sent to each of the processors and to rebuild the response thereon. Because there are two coherency ordering queues, two tracker queues, and two processors, the preferred embodiment of the system will be provided with an operation for arbitrating between the two processor links. For example, a round robin arbitration scheme is used to choose which response is processed first by response control 146 when two coherency responses arrive at the same time. However, if, for example, processor A's response is given priority but it cannot proceed until processor B's response proceeds, then processor B will be given priority. Accordingly, response control 146 is structured so as to process the output from the two ordering queues.

Note that only one header and response queue is used for both processors. Consequently, there are two embodiments for queue management. In the first embodiment, the writes of processor A are independent of the COHs of processor B, and the writes of processor B are independent of the COHs of processor A. This is accomplished by tracking the write responses being loaded into the header/response queue from the two different processors separately. Thus, a response from processor A would only cause a counter in coherent ordering queue A to be incremented, and a write being cleared from the response queue that originated from processor A would only cause a counter in coherent ordering queue A to be decremented. Similarly, a response from processor B would only cause a counter in coherent ordering queue B to be incremented, and a write being cleared from the response queue that originated from processor B would only cause a counter in coherent ordering queue B to be decremented. Additional logic is present in response control 146 to allow for the individual control of the different ordering queues based on the originating processor. This would allow for COHs from one processor to pass writes from the other processor. Having a COH pass a write in this case will not cause problems as only one processor can own data at a given time. The second embodiment is the COHs of processor A are dependent upon the writes of processor B and the COHs of processor B are dependent upon the writes of processor A. Each time a write is placed into the header/response queues, both ordering queues have appropriate counters incremented. Thus, a COH from processor B cannot pass a prior write from processor A, and a COH from processor A cannot pass a prior write from processor B. This embodiment is simpler than the first embodiment, but is less efficient as an unnecessary dependency is introduced into the queues.

With general reference to FIG. 7, the system contemplated by the present invention further provides that one processor is able to perform a flush operation to a cache line owned by another processor. Thus, processor A represented by Block 108 and processor B, represented by block 110, would be able to do a flush operation to each other such that processor A in Block 108 would be able to flush the cache 110A of processor B located at Block 110. In order to accomplish such an operation, the ordering processor would issue an instruction ordering the flush operation. The instruction would go to memory 150, where it will be determined which processor is the owner of the information. Then the operation will be sent out as a transaction to the owning processor, via memory input logic 142, processor output logic 140, and the processor bus 112. The processor which has been requested to flush will take a look at its cache and respond accordingly. Continuing in the example, the present structure provides greater flexibility if processor B at 110 were to have say, a dirty cache (i.e., is a cache which has data that has been altered), then the processor B at 110 is able to respond with a COH copy-out. A COH copy-out means that its associated processor has the cache line and will supply the data as a copy-out operation. In this case the data goes to memory. In other cases, the data goes to memory and the requesting processor.

Figure 6:
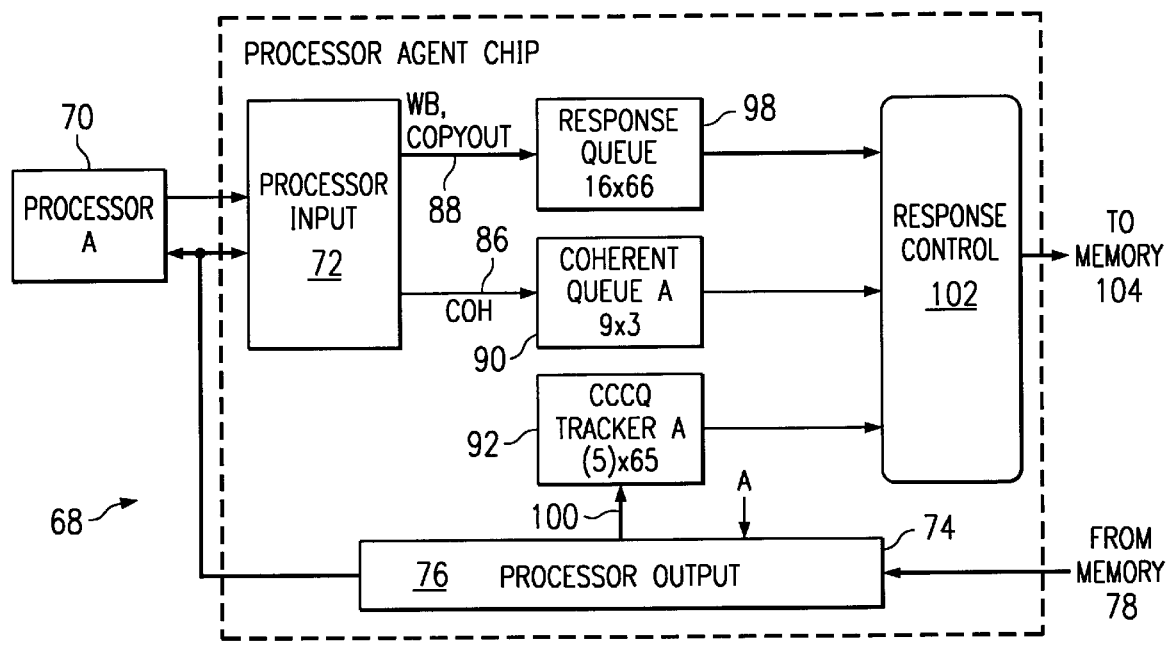
FIG. 6 depicts the ordering queue operation inside a processor agent chip of the prior art.

By way of contrast with FIG. 7, FIG. 6 depicts a prior art ordering queue 90 operating within a processor agent chip. This queue would send 104 and receive 78 information from memory, as well as communicate with processor 70. This arrangement has some elements which are similar to those of FIG. 7, for example processor input 72, processor output 76, response queue 98, CCCQ tracking queue 92, and response queue 102. However, coherent ordering queue 90 is different from the coherent ordering queues 132, 134 of FIG. 7. The internal structure and operation of the coherent ordering queue 90 is shown in FIGS. 8A and 8B.

Another operation contemplated by the structure of the present invention is a cache-to-cache transaction. This involves a copy-out transaction which will occur where one processor notifying the other processor that it is in possession of information in the cache and that it will send the information to the other processor. Accordingly, the possessing processor will send the information from the requested cache to the requesting cache. As such, the cache-to-cache transaction is essentially a copy-out transaction. The flexibility is that the system allows cache to cache writes from processors on different busses, as well as, on the same bus. Accordingly, cache-to-cache transaction will be reflected from the coherency ordering queue 132 or 134 depending on the origin and response control 146 will arbitrate by picking an active input from either 132 or 134 at which point the writes in the response queue will be popped out and a copy-out will be received. Should the wrong copy-out be read, the arbitration therefore must be altered by changing the active input from either 132 or 134 to match the copyout data of the head of the response queue.

As a full example of the operation of the coherent ordering queue inside the processor agent chip with two processors, suppose that another processor does a flush operation to a cache line owned by Processor B 110. The memory sends a DFLUSH transaction on a bus at 142. The processor output sends the DFLUSH transaction to Processor B 110 on Processor Bus 112. It also sends important information (address, type of transaction, etc.) to CCCQ Tracker B at 138. If Processor B 110 has a dirty cache line it will respond "COH-COPYOUT" on coherency Bus 114. Then, it will send the cache line as a COPYOUT transaction on Processor Bus 112. The COPYOUT will be put into the response queue 130 and a header marking it as a copyout which will be put into the Header Queue 128, while "COH-COPYOUT" has already been put into the Coherent Ordering Queue B at 134.

When the Response control sees the information in CCCQ Tracker B at 138, the COH-COPYOUT in Coherent Ordering Queue B at 134 and the COPYOUT from Processor B 110 in the Header Queue 128 it will create a transaction (a cache to cache transaction or "C2C") with the Response Queue 130 COPYOUT and send the C2C to memory 150.

If Processor B 110 sends writes on processor bus 112 between the COH-COPYOUT and the COPYOUT, then writes will be ahead of the COPYOUT in the Response Queue 130, and Header Queue 128. The Response Control 146 will accordingly send the writes (deleting them from the Coherent Ordering Queue B) until it gets to the COPYOUT.

If Processor B 110 did not have the cache line or had not written to it, then when it gets the DFLUSH transaction on Processor Bus 112 it will respond "COH-OK" on Coherency Bus 114. The "COH-OK" will be put into Coherent Ordering Bus 114. When the Response Control sees the CCCQ Tracker B 130 information and the "COH-OK" in Coherent Ordering Queue B 134 it will create a transaction (a COH-OK transaction) from the information in CCCQ Tracker B 138 and send the COH-OK to memory 150.

If Processor B 110 sends writes on processor bus 112 before the "COH-OK" on Coherency Bus 114, then the write counters in Coherent Ordering Queue B 134 will increment, accordingly. The "COH-OK" will be stored at the same place in the Coherent Ordering Queue 134 as the write. This means that the "COH-OK" cannot be sent out before the writes. Response Control 146 will process the writes before the "COH-OK." Response Control 146 sees the write bit from the Coherent Ordering Queue B 134, and the write in the Header Queue 128 and sends out the write in the Response Queue. When the writes that are ahead of the "COH-OK" have been processed, the write bit from the Coherent Ordering Queue 134 will go to zero and the Response Queue 130 will send out the COH-OK as above. The Coherent Ordering Queue 134 is then popped (since the COH element was processed) and if there were writes behind the "COH-OK" then the write bit will be set and Response Control 146 will process the writes as above.

As such, the size of the Coherent Ordering Queue (conceptually) is the sum of the CCCQ Tracker and the Header Queue since it needs to hold COHs from the CCCQ Tracker and writes from the Response Queue. Conceptually this makes 5 COHs and 12 writes or a depth of 17 and a width of 3 (2 or COHs, 1 for writes). As mentioned earlier, a queue of 17 is very hard to search, and as such the coherent ordering queue design contemplated reduces the depth. The depth is 1+CCCQ Tracker depth or 1+5=6. (the extra room is for writes following the $5^{th}$ COH response). The width is $2+[\log_2(\text{Header Queue Depth}+1)]$ or $2+[\log_2(12+1)]=2+4=$ 6. The Write Count in the COH Ordering Queue must hold all writes in the Header Queue.

Note that the inventive ordering queue can be used to track different information types other than writes and/or COHs. This queue can be used whenever coherency or other hierarchical requirements impose ordering or handling rules on processing different information types.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer system having a processor that communicates with at least one other element of the computer system with at least one first information instance of a first information type and at least one second information instance of a second information type, wherein the system has at least one rule for prioritizing transmission of the first information type and the second information type, the system comprising:
    an ordering queue that maintains a sequential order of entry into the ordering queue of the first information instance and the second information instance, wherein the ordering queue has a predetermined number of slots, with each slot having a predetermined size;
    wherein the predetermined number is associated with a number of instances of the first information type that the computer system is capable of managing in a time period, and the predetermined size is associated with a number of instances of the second information type that the computer system is capable of managing in a time period.

2. The computer system of claim 1, wherein:
    the predetermined number is the number of instances of the first information type that the computer system is capable of managing at a time period plus one; and
    the predetermined size is a binary representation of the number of instances of the second information type that the computer system is capable of managing at a time period plus one plus a binary size of the first information type.

3. The computer system of claim 1, wherein the ordering queue is a first-in-first-out queue, and the ordering queue comprises:
    a pointer register that holds a value identifying the most downstream slot which does not contain a first information instance.

4. The computer system of claim 3, wherein:
    the pointer register is incremented for each first information instance that enters the ordering queue and is decremented for each first information instance that is removed from the ordering queue.

5. The computer system of claim 4, wherein:
    contents of the most downstream slot are removed from the queue when the pointer register is decremented, and contents of each remaining slot is shifted by one slot in the downstream direction when the pointer register is decremented.

6. The computer system of claim 3, wherein each slot comprises:
    a first portion for storing the first information instance; and
    a second portion for storing a count of a number of instances of the second information type that enter the ordering queue prior to entry of the first information instance.

7. The computer system of claim 6, wherein:
    the count of the second portion of slot identified by the pointer register is incremented for each second information instance entering the queue.

8. The computer system of claim 6, wherein each second information instance is a marker for a packet of information stored in another queue, and wherein:
    the count of the second portion of the most downstream slot which contains a nonzero count is decremented as each packet of information is removed from the another queue.

9. The computer system of claim 1, wherein the at least one rule includes a first rule and a second rule, and wherein:
    the first rule defines that a subsequent second information instance in the sequential order is capable of being removed from the queue before prior first information in the sequential order; and
    the second rule defines that subsequent first information in the sequential order cannot be removed from the queue before prior second information in the sequential order.

10. The computer system of claim 1, wherein:
    the computer system is a multiprocessor computer system with coherent memory operations;
    the first information type is a coherency signal with a portion of the coherency signal being stored in the ordering queue and another portion being stored in a tracking queue; and
    the second information type is a write response with a one bit marker being stored in the ordering queue and the write response being stored in a response queue.

11. A method for operating a computer system having a processor that communicates with at least one other element of the computer system with at least one first information instance of a first information type and at least one second information instance of a second information type, wherein the system has at least one rule for prioritizing transmission of the first information type and the second information type, the method comprising the steps of:
    providing an ordering queue with a predetermined number of slots which is associated with a number of instances of the first information type that the computer system is capable of managing in a time period, with each slot having a predetermined size which is associated with a number of instances of the second information type that the computer system is capable of managing in a time period; and
    maintaining a sequential order of entry into the ordering queue of the first information instance and the second information instance via the ordering queue.

12. The method of claim 11, wherein:
    the predetermined number is the number of instances of the first information type that the computer system is capable of managing at a time period plus one; and the predetermined size is a binary representation of the number of instances of the second information type that the computer system is capable of managing at a time period plus one plus a binary size of the first information type.

13. The method of claim 1, wherein the ordering queue is a first-in-first-out queue, and the method further comprises the step of:

storing a value that identifies the most downstream slot which does not contain a first information instance in a pointer register.

14. The method of claim 13, further comprising the steps of:

incrementing the pointer register for each first information instance that enters the ordering queue; and decrementing the pointer register for each first information instance that is removed from the ordering queue.

15. The method of claim 14, further comprising the steps of:

removing contents of the most downstream slot from the queue when the pointer register is decremented; and shifting contents of each remaining slot by one slot in the downstream direction when the pointer register is decremented.

16. The method of claim 13, further comprising the step of:

storing the first information instance in a first portion of a slot; and storing a count of a number of instances of the second information type that enter the ordering queue prior to entry of the first information instance in a second portion of a slot.

17. The method of claim 16, further comprising the step of:

incrementing the count of the second portion of slot identified by the pointer register for each second information instance entering the queue.

18. The method of claim 16, wherein each second information instance is a marker for a packet of information stored in another queue, and the method further comprises the step of:

decrementing the count of the second portion of the most downstream slot which contains a non-zero count as each packet of information is removed from the another queue.

19. The method of claim 1, wherein the at least one rule includes a first rule and a second rule, and wherein:

the first rule defines that a subsequent second information instance in the sequential order is capable of being removed from the queue before prior first information in the sequential order; and the second rule defines that subsequent first information in the sequential order cannot be removed from the queue before prior second information in the sequential order.

20. The method of claim 1, wherein:

the computer system is a multiprocessor computer system with coherent memory operations;

the first information type is a coherency signal with a portion of the coherency signal being stored in the ordering queue and another portion being stored in a tracking queue; and the second information type is a write response with a one bit marker being stored in the ordering queue and the write response being stored in a response queue.

* * * * *